(12) United States Patent  (10) Patent No.: US 7,842,638 B2
Gibson et al.  (45) Date of Patent: Nov. 30, 2010

(54) POLYMERISATION CATALYST

(75) Inventors: Vernon Charles Gibson, London (GB); Atanas Kostadinov Tomov, Surrey (GB); Grant Berent Jacobsen, Tervuren (BE)

(73) Assignee: Ineos Europe Limited, Hampshire (GB)

( * ) Notice: Subject to any disclaimer, the term of this patent is extended or adjusted under 35 U.S.C. 154(b) by 653 days.

(21) Appl. No.: 11/632,637

(22) PCT Filed: Jun. 23, 2005

(86) PCT No.: PCT/GB2005/002484

§ 371 (c)(1),
(2), (4) Date: Oct. 18, 2007

(87) PCT Pub. No.: WO2006/008438

PCT Pub. Date: Jan. 26, 2006

(65) Prior Publication Data

US 2008/0200625 A1  Aug. 21, 2008

(30) Foreign Application Priority Data

Jul. 15, 2004 (GB) .................................. 0415879.6

(51) Int. Cl.
*B01J 31/18* (2006.01)
*B01J 31/22* (2006.01)
*C08F 4/602* (2006.01)

(52) U.S. Cl. ........................ 502/167; 502/103; 502/104; 502/108; 526/75; 526/161; 526/165

(58) Field of Classification Search ................. 502/103, 502/108, 155, 167, 104; 526/75, 161, 165
See application file for complete search history.

(56) References Cited

U.S. PATENT DOCUMENTS 6,281,303 B1  8/2001 Lavoie et al.

FOREIGN PATENT DOCUMENTS

| EP | 0 942 010 A1 | 9/1999 |
|---|---|---|
| WO | WO 01/74831 A1 | 10/2001 |
| WO | WO 01/98381 A2 | 12/2001 |
| WO | WO 01/98381 A3 | 12/2001 |
| WO | WO 2004/083263 A1 | 9/2004 |
| WO | WO2005/005494 A2 | 1/2005 |

*Primary Examiner*—Caixia Lu
(74) *Attorney, Agent, or Firm*—Nixon & Vanderhye

(57) ABSTRACT

A polymerisation catalyst comprising (1) a transition metal compound of Formula (A), and optionally (2) an activator, wherein Z is 5-membered heterocyclic containing carbon, nitrogen and at least one other selected from nitrogen, sulphur and oxygen, the remaining atoms in the ring being nitrogen and carbon; M is a metal from Group 3 to 11 or a lanthanide metal; $E^1$ and $E^2$ are divalent hydrocarbon, heterocyclic or heterosubstituted derivatives of these; $D^1$ and $D^2$ are donor atoms or groups; X is an anionic group, L is a neutral donor group; n=m=zero or 1; y and z are zero or integers so that X and L satisfy the valency/oxidation state of M, characterized in that the complex contains at least one polymerisable olefinic double bond which is present in, or substituent to, at least one of the atoms, groups or ligands represented by Z, E, D and L. The catalyst binds to the forming polymer providing product with good particle morphology.

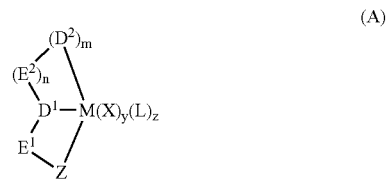

(A)

31 Claims, No Drawings

POLYMERISATION CATALYST

This application is the U.S. National Phase of International Application PCT/GB2005/002484, filed 23 Jun. 2005, which designated the U.S. PCT/GB2005/002484 claims priority to British Application No. 0415879.6 filed 15 Jul. 2004. The entire content of these applications are incorporated herein by reference.

The present invention relates to transition metal-based polymerisation and oligomerisation catalysts and to their use in the polymerisation, copolymerisation and oligomerisation of olefins.

The use of certain transition metal compounds to polymerise 1-olefins, for example, ethylene or propylene, is well established in the prior art. The use of Ziegler-Natta catalysts, for example, those catalysts produced by activating titanium halides with organometallic compounds such as triethylaluminium, is fundamental to many commercial processes for manufacturing polyolefins. Over the last three decades, advances in the technology have led to the development of Ziegler-Natta catalysts which have such high activities that olefin polymers and copolymers containing very low concentrations of residual catalyst can be produced directly in commercial polymerisation processes. The quantities of residual catalyst remaining in the produced polymer are so small as to render unnecessary their separation and removal for most commercial applications. Such processes can be operated by polymerising the monomers in the gas phase, or in solution or in suspension in a liquid hydrocarbon diluent, or, in the case of propylene in bulk.

Commodity polyethylenes are commercially produced in a variety of different types and grades. Homopolymerisation of ethylene with transition metal based catalysts leads to the production of so-called "high density" grades of polyethylene. These polymers have relatively high stiffness and are useful for making articles where inherent rigidity is required. Copolymerisation of ethylene with higher 1-olefins (eg butene, hexene or octene) is employed commercially to provide a wide variety of copolymers differing in density and in other important physical properties. Particularly important copolymers made by copolymerising ethylene with higher 1-olefins using transition metal based catalysts are the copolymers having a density in the range of 0.91 to 0.93. These copolymers which are generally referred to in the art as "linear low density polyethylene" are in many respects similar to the so-called "low density" polyethylene produced by the high pressure free radical catalysed polymerisation of ethylene. Such polymers and copolymers are used extensively in the manufacture of flexible blown film.

Polypropylenes are also commercially produced in a variety of different types and grades. Homopolymerisation of propylene with transition metal based catalysts leads to the production of grades with a wide variety of applications. Copolymers of propylene with ethylene or terpolymers with ethylene and higher 1-olefins are also useful materials, often used in film applications.

In recent years the use of certain metallocene catalysts (for example biscyclopentadienylzirconiumdichloride activated with alumoxane) has provided catalysts with potentially high activity. Other derivatives of metallocenes have been shown to be potentially useful for producing polypropylene with good activity, molecular weight and tacticity control. However, metallocene catalysts of this type suffer from a number of disadvantages, for example, high sensitivity to impurities when used with commercially available monomers, diluents and process gas streams, the need to use large quantities of expensive alumoxanes to achieve high activity, difficulties in putting the catalyst on to a suitable support and synthetic difficulties in the production of more complex catalyst structures suitable for polymerising propene in a tactic manner.

Olefin oligomerisation is also a commercially important process, leading to the production of 1-olefins (1-hexene, 1-octene, 1-decene, etc) that find utility in a wide range of applications, for example as comonomers for linear low density polyethylene, monomers for poly(1-olefins) and starting materials for surfactants. Catalysts based on a wide range of metal complexes may be used for this process and typically produce a so-called "Schulz-Flory" distribution of 1-olefins. More recently catalysts have emerged that selectively produce only 1-hexene by a distinctive trimerisation mechanism. Typically the final distribution of 1-olefins produced is of importance commercially.

WO 2004/083263 (BP Chemicals Limited) published on 30 Sep. 2004 discloses, inter alia, a polymerisation catalyst comprising (1) a transition metal compound of Formula A, and optionally (2) an activating quantity of a suitable activator,

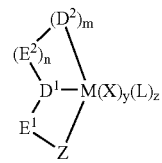

Formula A wherein Z is an imidazole-containing group; M is a metal from Group 3 to 11 of the Periodic Table or a lanthanide metal; $E^1$ and $E^2$ are divalent groups independently selected from (i) aliphatic hydrocarbon, (ii) alicyclic hydrocarbon, (iii) aromatic hydrocarbon, (iv) alkyl substituted aromatic hydrocarbon (v) heterocyclic groups and (vi) heterosubstituted derivatives of said groups (i) to (v); $D^1$ and $D^2$ are donor groups; X is an anionic group, L is a neutral donor group; n=m=zero or 1; y and z are independently zero or integers such that the number of X and L groups satisfy the valency and oxidation state of the metal M. The imidazole-containing group Z is preferably a group of formula I, II or III (see below), wherein $R^1$ to $R^{11}$ can be selected from a wide variety of substituents. Amongst the listed substituents is "ethylenyl". However, there is no disclosure of the use of a compound of this type.

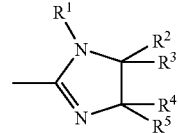

Formula I

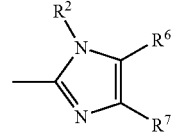

Formula II

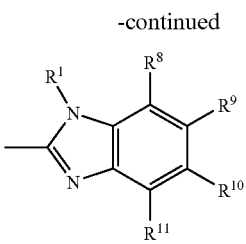

WO 2005/005494 (Atofina Research) published on 20 Jan. 2005 discloses a process for polymerising olefin monomer in the presence of certain metallocene and non-metallocene transition metal complex catalyst components, the catalyst component comprising one or more alkyl moieties having a terminal olefin group. The catalyst complex can comprise a complex of formula $(L)_nM(Q)_p$ wherein L is a heteroatom-containing ligand, M is defined transition metal and Q is defined hydrocarbon or halogen. L can be, inter alia, a bidentate ligand of formula

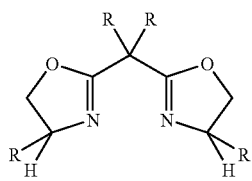

A problem associated with homogeneous transition metal catalyst systems (for example, systems that are soluble in a liquid diluent in which the polymerisation is being performed) is that the produced polymer has low bulk density and a poor morphology.

An object of the present invention is to provide a catalyst suitable for polymerising or oligomerising monomers, for example, olefins, cycloolefins or diolefins, and especially for polymerising or oligomerising ethylene alone or propylene alone, or for copolymerising ethylene with higher 1-olefins with high activity. A further object of the invention is to provide an improved process for the polymerisation of olefins. Yet another object of the present invention is to provide a process capable of producing solid polyolefins having improved particle morphology.

The present invention provides a novel polymerisation catalyst comprising
(1) a transition metal compound having the following Formula A, and optionally
(2) an activating quantity of a suitable activator,

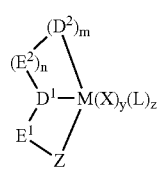

Formula A wherein Z comprises a five-membered heterocyclic group, the five membered heterocyclic group containing at least one carbon atom, at least one nitrogen atom and at least one other hetero atom selected from nitrogen, sulphur and oxygen, the remaining atoms in said ring being selected from nitrogen and carbon; M is a metal from Group 3 to 11 of the Periodic Table or a lanthanide metal; $E^1$ and $E^2$ are divalent groups independently selected from (i) aliphatic hydrocarbon, (ii) alicyclic hydrocarbon, (iii) aromatic hydrocarbon, (iv) alkyl substituted aromatic hydrocarbon (v) heterocyclic groups and (vi) heterosubstituted derivatives of said groups (i) to (v); $D^1$ and $D^2$ are donor atoms or groups; X is an anionic group, L is a neutral donor group; n=m=zero or 1;y and z are independently zero or integers such that the number of X and L groups satisfy the valency and oxidation state of the metal M, characterized in that the complex contains at least one polymerisable olefinic double bond which is present in, or substituent to, at least one of the atoms, groups or ligands represented by Z, E, D and L and with the proviso that when Z is an imidazole-containing group selected from

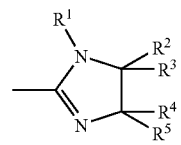

Formula I

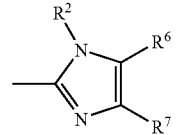

Formula II

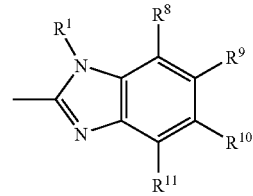

Formula III then none of the groups $R^1$ to $R^{11}$ is ethylenyl, and further with the proviso that the ligand in Formula A represented by $-Z-E^1-D^1-(E^2)_n-(D^2)_m-$ is not a ligand containing the heterocyclic unit

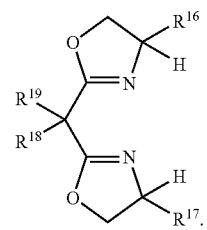

wherein $R^{16}$ and $R^{17}$ are each independently hydrocarbyl or substituted hydrocarbyl, $R^{18}$ and $R^{19}$ are each independently hydrogen, hydrocarbyl or substituted hydrocarbyl and wherein $R^{18}$ and $R^{19}$ can be taken together to form a ring.

The first proviso above excludes from the scope of the present invention complexes specifically disclosed in WO 2004/083263,and the second proviso excludes complexes specifically disclosed in WO 2005/005494.

The polymerisable olefinic double bond can be alicyclic or acyclic. The polymerisable olefinic double bond can be present as one such double bond, or a plurality of such double bonds or as part of a conjugated or non-conjugated system of double bonds provided the double bond or system of double bonds is not stabilised by electron delocalisation, resonance or steric hindrance to the extent that it will no longer copolymerise with the 1-olefin monomer using the transition metal catalysts described herein. For the avoidance of doubt, benzene and delocalised cyclopentadienyl rings are not regarded as containing olefinic double bonds for the purposes of the present invention.

In one embodiment of the present invention the double bond is preferably acyclic. In another embodiment the double bond can be present in a ring, preferably a carbon ring. Examples are cyclopentene, cyclohexene and cycloheptene and alkyl or aryl substituted derivates thereof. The double bond can be part of a straight chain or branched chain substituent and can be present with or without cyclic units eg phenyl or benzyl. Thus, for example, it can be present in a branched or straight chain substituent which itself can comprise aliphatic and or aromatic units. It is preferably present in a straight chain substituent. Most preferably it is comprised by a substituent having the general formula —$R^x$—CH=CH$_2$ wherein $R^x$ is a divalent organic group, preferably a hydrocarbon group, for example —(CR$^y$$_2$)$_p$— wherein the $R^y$ groups are the same or different and are selected from hydrogen, $C_1$ to $C_{10}$ alkyl, aryl (eg phenyl or naphthyl) and p is zero or an integer from 1 to 20.

When the double bond is present as a conjugated or unconjugated diene system such a system can comprise two or more double bonds. The conjugated or unconjugated double bonds are preferably present in an aliphatic chain represented by —(CR$_2$)$_m$—(CR=CR)$_n$—R wherein the R groups are the same or different and are selected from hydrogen, $C_1$ to $C_{10}$ alkyl, aryl (eg phenyl or naphthyl), m is 0 to 10 and n is 1 to 3.

Preferably the divalent groups $E^1$ and $E^2$ are not linked other than through the donor atom of group $D^1$.

At least one of the atoms present in the ring of the five-membered heterocyclic group Z is preferably bonded directly to $E^1$ and preferably a second atom in the ring is bonded directly to M. Most preferably the atom in the five-membered ring bonded directly to $E^1$ is adjacent to a second atom in said ring, said second atom being bonded directly to M.

The five-membered heterocyclic group Z preferably contains at least 2 carbon atoms in its ring and more preferably at least 3 carbon atoms in its ring. Preferably the ring contains at least 2 nitrogen atoms. Examples of suitable 5-membered heterocyclic groups are (but are not restricted to):

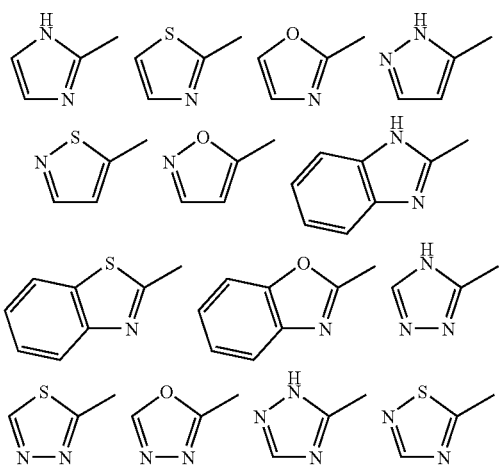

-continued

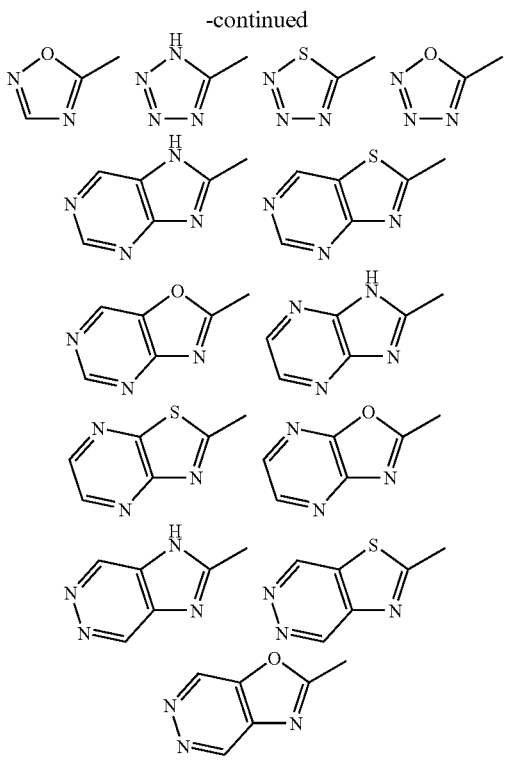

In a preferred embodiment of the present invention Z, in Formula A, is specifically an imidazole-containing group.

Thus, the present invention further provides a novel polymerisation catalyst comprising (1) a transition metal compound having the following Formula A, and optionally (2) an activating quantity of a suitable activator,

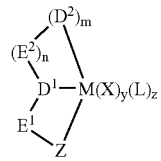

Formula A wherein Z is specifically an imidazole-containing group; M is a metal from Group 3 to 11 of the Periodic Table or a lanthanide metal; $E^1$ and $E^2$ are divalent groups independently selected from (i) aliphatic hydrocarbon, (ii) alicyclic hydrocarbon, (iii) aromatic hydrocarbon, (iv) alkyl substituted aromatic hydrocarbon (v) heterocyclic groups and (vi) hetero-substituted derivatives of said groups (i) to (v); $D^1$ and $D^2$ are donor groups; X is an anionic group, L is a neutral donor group; n=m=zero or 1;y and z are independently zero or integers such that the number of X and L groups satisfy the valency and oxidation state of the metal M, characterized in that the complex contains at least one polymerisable olefinic double bond which is present in, or substituent to, at least one of the atoms, groups or ligands represented by Z, E, D and L. and with the proviso that when Z is an imidazole-containing group selected from

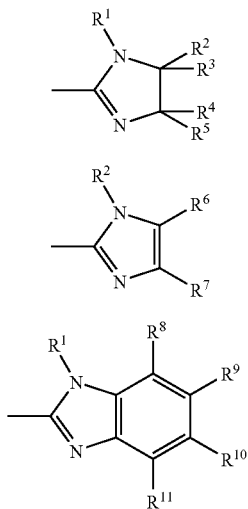

Formula I

Formula II

Formula III then none of the groups $R^1$ to $R^{11}$ is ethylenyl.

$D^1$ and/or $D^2$ are donor atoms or groups containing at least one donor atom. $D^1$ and/or $D^2$ can be, for example, groups having the same formula as recited for group Z. For example $D^1$ and/or $D^2$ can be groups comprising a five-membered heterocyclic group containing at least 2 carbon atoms in its ring and more preferably at least 3 carbon atoms in its ring. $D^1$ and/or $D^2$ can be imidazole-containing groups if desired. When $D^1$ and/or $D^2$ are an imidazole-containing group this or these can be identical with Z. In a preferred embodiment $D^2$ and Z are identical imidazole containing groups.

The imidazole-containing group Z is preferably a group of formula I, II or III

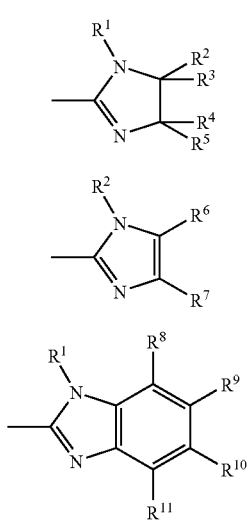

Formula I

Formula II

Formula III $R^1$ to $R^{11}$ are independently hydrogen or a monovalent (i) aliphatic hydrocarbon, (ii) alicyclic hydrocarbon, (iii) aromatic hydrocarbon, (iv) alkyl substituted aromatic hydrocarbon (v) heterocyclic groups, (vi) heterosubstituted derivatives of said groups (i) to (v), and (vii) hydrocarbyl-substituted heteroatom groups. The "free" valence bond on the left of Formulae I, II and III provides at least one of the links of E into the rest of Formula A. The other link or links are preferably provided by at least one of the nitrogen atoms in the imidazole-containing group. These defined groups $R^1$ to $R^{11}$ preferably contain 1 to 30, more preferably 2 to 20, most preferably 2 to 12 carbon atoms. Examples of suitable aliphatic hydrocarbon groups are methyl, ethyl, ethylenyl, butyl, hexyl, isopropyl and tert-butyl. Examples of suitable alicyclic hydrocarbon groups are adamantyl, norbornyl, cyclopentyl and cyclohexyl. Examples of suitable aromatic hydrocarbon groups are phenyl, biphenyl, naphthyl, phenanthryl and anthryl. Examples of suitable alkyl substituted aromatic hydrocarbon groups are benzyl, tolyl, mesityl, 2,6-diisopropylphenyl and 2,4,6-triisopropyl. Examples of suitable heterocyclic groups are 2-pyridinyl, 3-pyridinyl, 2-thiophenyl, 2-furanyl, 2-pyrrolyl, 2-quinolinyl. Suitable substituents for forming heterosubstituted derivatives of said groups $R^1$ to $R^{11}$ are, for example, chloro, bromo, fluoro, iodo, nitro, amino, cyano, ether, hydroxyl and silyl, methoxy, ethoxy, phenoxy (i.e. $—OC_6H_5$), tolyloxy (i.e. $—OC_6H_4(CH_3)$), xylyloxy, mesityloxy, dimethylamino, diethylamino, methylethylamino, thiomethyl, thiophenyl and trimethylsilyl. Examples of suitable heterosubstituted derivatives of said groups (i) to (v) are 2-chloroethyl, 2-bromocyclohexyl, 2-nitrophenyl, 4-ethoxyphenyl, 4-chloro-2-pyridinyl, 4-dimethylaminophenyl and 4-methylaminophenyl. Examples of suitable hydrocarbyl-substituted heteroatom groups are chloro, bromo, fluoro, iodo, nitro, amino, cyano, ether, hydroxyl and silyl, methoxy, ethoxy, phenoxy (i.e. $—OC_6H_5$), tolyloxy (i.e. $—OC_6H_4(CH_3)$), xylyloxy, mesityloxy, dimethylamino, diethylamino, methylethylamino, thiomethyl, thiophenyl and trimethylsilyl. Any of the substituents $R^1$ to $R^{11}$ may be linked to form cyclic structures. Substituents $R^2$ to $R^{11}$ may also suitably be inorganic groups such as fluoro, chloro, bromo, iodo, nitro, amino, cyano and hydroxyl.

Further suitable imidazole-containing groups may be obtained by removal of substituent $R_1$, for example by deprotonation when $R^1$ is hydrogen, to give formally monoanionic imidazole-containing groups.

It is preferred that the imidazole-containing group has a structure described in formula III (a "benzimidazole"). $R^1$ is preferably hydrogen, an aliphatic hydrocarbon group, an aromatic hydrocarbon group or is removed to give a formally monoanionic benzimidazole group. $R^8$ to $R^{11}$ are preferably hydrogen, an aliphatic hydrocarbon group or an aromatic hydrocarbon group.

$E^1$ and $E^2$ (hereinafter referred to as "E") can be the same or different. E is independently selected from divalent (i) aliphatic hydrocarbon, (ii) alicyclic hydrocarbon, (iii) aromatic hydrocarbon, (iv) alkyl substituted aromatic hydrocarbon (v) heterocyclic groups, (vi) heterosubstituted derivatives of said groups (i) to (v), and (vii) hydrocarbyl-substituted heteroatom groups. Examples of suitable divalent groups E are $—CH_2—$, $—CH_2CH_2—$, $—CH_2CH_2CH_2—$, 1,2-phenylene, trans-1,2-cyclopentane, trans-1,2-cyclohexane, 2,3-butane, 1,1'-biphenyl, 1,1'-binaphthyl, and $—Si(Me)_2$-. It is preferred that E is an aliphatic or aromatic hydrocarbon group. More preferably the divalent group E is $—CH_2—$.

$D^1$ and $D^2$ can be the same or different donor groups, for example oxygen, sulfur, an amine, an imine or a phosphine. Preferably $D^1$ and $D^2$ are selected from oxygen, sulfur, an amine of formula $—N(R^{12})—$ or a phosphine of formula $—P(R^{13})—$ wherein $R^{12}$ and $R^{13}$ are hydrogen or (i) aliphatic hydrocarbon, (ii) alicyclic hydrocarbon, (iii) aromatic hydrocarbon, (iv) alkyl substituted aromatic hydrocarbon (v) heterocyclic groups, (vi) heterosubstituted derivatives of said groups (i) to (v), (vii) hydrocarbyl-substituted heteroatom groups and (viii) further imidazole-containing groups. Alternatively $R^{12}$ or $R^{13}$ may be removed, for example by deprotonation when they are hydrogen, to give a formally monoanionic fragment; or if both $R^{12}$ or $R^{13}$ are removed they provide a formally dianionic fragment. More preferably $D^2$ is an amine of formula —N($R^{12}$)— as defined above. $R^{12}$ is preferably hydrogen, an aliphatic hydrocarbon, an aromatic hydrocarbon or a further imidazole containing group. Preferably $D^2$ is an imidazole-containing group.

M is preferably a metal selected from Groups 3 to 11 of the periodic table, preferably from Groups 3 to 7,more preferably selected from Sc, Ti, Zr, Hf, V, Nb, Ta, Cr, Mo, W, Mn and Nd and most preferably V, Cr, Ti, Zr and Hf The anionic group X can be, for example, a halide, preferably chloride or bromide; or a hydrocarbyl group, for example, methyl, benzyl or phenyl; a carboxylate, for example, acetate or an acetylacetonate; an oxide; an amide, for example diethyl amide; an alkoxide, for example, methoxide, ethoxide or phenoxide; or a hydroxyl. Alternatively, X can be a non-coordinating or weakly-coordinating anion, for example, tetrafluoroborate, a fluorinated aryl borate or a triflate. The anionic groups X may be the same or different and may independently be monoanionic, dianionic or trianionic.

The neutral donor group L can be, for example, a solvate molecule, for example diethyl ether or THF; an amine, for example, diethyl amine, trimethylamine or pyridine; a phosphine, for example trimethyl phosphine or triphenyl phosphine; or water; or an olefin or a neutral, conjugated or non-conjugated diene, optionally substituted with one or more groups selected from hydrocarbyl or trimethylsilyl groups, said group having up to 40 carbon atoms and forming a pi-complex with M. When L is a diene ligand, it can be, for example s-trans-$\eta^4$-1,4-diphenyl-1,3-butadiene; s-trans-$\eta^4$-3-methyl-1,3-pentadiene; s-trans-$\eta^4$-1,4-dibenzyl-1,3-butadiene; s-trans-$\eta^4$-2,4-hexadiene; s-trans-$\eta^4$-1,3-pentadiene; s-trans-$\eta^4$-1,4-ditolyl-1,3-butadiene; s-trans-$\eta^4$-1,4-bis(trimethylsilyl)-1,3-butadiene; s-trans-$\eta^4$-1,4-diphenyl-1,3-butadiene; s-cis-$\eta^4$-3-methyl-1,3-pentadiene; s-cis-$\eta^4$-1,4-dibenzyl-1,3-butadiene; s-cis-$\eta^4$-2,4-hexadiene; s-cis-$\eta^4$-1,3-pentadiene; s-cis-$\eta^4$-1,4-ditolyl-1,3-butadiene; or s-cis-$\eta^4$-1,4-bis(trimethylsilyl)-1,3-butadiene, said s-cis isomers forming a .pi.-bound diene complex;

The value of y depends on the formal charge on each group Z and D, the charge on the anionic group X and the oxidation state of the metal M. For example, if M is chromium in oxidation state +3,Z is a neutral group and both D groups are neutral, then y is 3 if X is a monoanionic group (eg. chloride); if M is chromium in oxidation state +3,the Z group is neutral, one D group is monoanionic and the other D is neutral, then y is 2 if all X groups are monoanionic groups (e.g. chloride).

The optional activator (2) for the catalyst of the present invention is suitably selected from organoaluminium compounds and organoboron compounds or mixtures thereof. Examples of organoaluminium compounds include trialkyaluminium compounds, for example, trimethylaluminium, triethylaluminium, tributylaluminium, tri-n-octylaluminium; alkylaluminium halides, for example ethylaluminium dichloride, diethylaluminium chloride, dimethyl aluminium chloride, tris(pentafluorophenyl)aluminium and-alumoxanes. Alumoxanes are well known in the art as typically the oligomeric compounds which can be prepared by the controlled addition of water to an alkylaluminium compound, for example trinethylaluminium. Such compounds can be linear, cyclic or mixtures thereof. Commercially available alumoxanes are generally believed to be mixtures of linear, cyclic and cage compounds. The cyclic alumoxanes can be represented by the formula $[R^{16}AlO]_s$ and the linear alumoxanes by the formula $R^{17}(R^{18}AlO)_s$ wherein s is a number from about 2 to 50, and wherein $R^{16}$, $R^{17}$, and $R^{18}$ represent hydrocarbyl groups, preferably $C_1$ to $C_6$ alkyl groups, for example methyl, ethyl or butyl groups.

Examples of suitable organoboron-compounds are dimethylphenylammoniumtetra(phenyl)borate, trityltetra(phenyl)borate, triphenylboron, dimethylphenylammonium tetra(pentafluorophenyl)borate, sodium tetrakis[(bis-3,5-trifluoromethyl)phenyl]borate, $H^+(OEt_2)$[(bis-3,5-trifluoromethyl)phenyl]borate, trityltetra(pentafluorophenyl)borate and tris(pentafluorophenyl)boron. Mixtures of organoaluminium compounds and organoboron compounds may be used.

In the preparation of the catalysts of the present invention the quantity of activating compound selected from organoaluminium compounds and organoboron compounds to be employed is easily determined by simple testing, for example, by the preparation of small test samples which can be used to polymerise small quantities of the monomer(s) and thus to determine the activity of the produced catalyst. It is generally found that the quantity employed is sufficient to provide 0.1 to 20,000 atoms, preferably 1 to 2000 atoms of aluminium or boron per atom of M present in the compound of Formula A. Mixtures of different activating compounds may be used.

EP1238989 discloses the use of activators (Lewis acids) selected from
- (b-1) ionic-bonding compounds having a $CdCl_2$ type or a $CdI_2$ type of layered crystal structure;
- (b-2) clays, clay minerals, or ion-exchange layered compounds;
- (b-3) heteropoly-compounds; and
- (b-4) halogenated lanthanoid compounds.

The activator employed in the present invention may be of the type disclosed in EP1238989 if desired. Such Lewis acids are those compounds which capable of receiving at least one electron pair and is capable of forming an ion pair by reaction with the transition metal complex. The Lewis acid includes the afore-mentioned (b-1) ionic-bonding compounds having a layered crystal structure of a $CdCl_2$ type or $CdI_2$ type (b-2) clay. clay minerals, or ion-exchange layered compounds, (b-3) heteropoly compounds, and (b-4) halogenated lanthanoid compounds. The Lewis acid further includes $SiO_2$, $Al_2O_3$, natural and synthetic zeolites which have Lewis acid points formed by heating or a like treatment, and complexes and mixtures thereof.

For an extensive list of substances of the type (b-1), (b-2), (b-3) and (b-4) referred to -above reference may be made to EP1238989.Illustrative of these types of substances are;

Type (b-1); $CdBr_2$, $FeBr_2$, $CoBr_2$, $NiBr_2$, $CdI_2$, $MgI_2$, $CaI_2$, $ZnI_2$, $PbI_2$, $MnI_2$, $FeI_2$, $CoI_2$, $CdCl_2$, $MnCl_2$, $FeCl_2$, $CoCl_2$, $NiI_2$, $NiCl_2$, $MgCl_2$, and $ZnBr_2$, more preferred are $MnCl_2$, $FeCl_2$, $CoCl_2$, $NiCl_2$, and $MgCl_2$.

Type (b-2); kaolinite, talc, kerolite, sericite, vermiculite, montmorillonite, beidllite and bentonite.

Type (b-3); phosphovanadic acid, phosphomolybdic acid, titanomolybdic acid, stannomolybdic acid, phosphotungstic acid, phosphomolybdovanadic acid, phosphotungstovanadic acid, and phosphomolybdoniobic acid; and salts of these acids with an element of Group 1 or 2 of Periodic Table including specifically lithium, sodium, potassium, rubidium, cesium, beryllium, magnesium, calcium, strontium, and barium, and organic salts such as triphenylethyl salt.

Type (b-4); lanthanum chloride, cerium chloride, praseodymium chloride, neodymium chloride, ytterbium chloride, and lutetium chloride; lanthanum bromide, cerium bromide, praseodymium bromide, neodymium bromide, lanthanum iodide, cerium iodide, praseodymium iodide, neodymium iodide, lutetium iodide, lanthanum fluoride, cerium fluoride, praseodymium fluoride, neodymium fluoride. Precursors of these substances can be employed as described in EP1238989.

U.S. Pat. No. 6,399,535 discloses a coordinating catalyst system capable of polymerizing olefins comprising:

(I) as a pre-catalyst, at least one non-metallocene, non-constrained geometry, bidentate ligand containing transition metal compound or tridentate ligand containing transition metal compound capable of (A) being activated upon contact with the catalyst support-activator agglomerate of (II) or (B) being converted, upon contact with an organometallic compound, to an intermediate capable of being activated upon contact with the catalyst support-activator agglomerate of (II), wherein the transition metal is at least one member selected from Groups 3 to 10 of the Periodic table; in intimate contact with (II) catalyst support-activator agglomerate comprising a composite of (A) at least one inorganic oxide component selected from $SiO_2$, $Al_2O_3$, MgO, $AlPO_4$, $TiO_2$, $ZrO_2$, and $Cr_2O_3$ and (B) at least one ion containing layered material having interspaces between the layers and sufficient Lewis acidity, when present within the catalyst support-activator agglomerate, to activate the pre-catalyst when the pre-catalyst is in contact with the catalyst support-activator agglomerate, said layered material having a cationic component and an anionic component, wherein said cationic component is present within the interspaces of the layered material, said layered material being intimately associated with said inorganic oxide component within the agglomerate in an amount sufficient to improve the activity of the coordinating catalyst system for polymerizing ethylene monomer, expressed as Kg of polyethylene per gram of catalyst system per hour, relative to the activity of a corresponding catalyst system employing the same pre-catalyst but in the absence of either Component A or B of the catalyst support-activator agglomerate; wherein the amounts of the pre-catalyst and catalyst support-activator agglomerate which are in intimate contact are sufficient to provide a ratio of micromoles of pre-catalyst to grams of catalyst support-activator agglomerate of from about 5:1 to about 500:1. The layered material can be, for example, a smectite clay. The catalyst system of the present invention can be employed with a catalyst support-activator agglomerate as described in U.S. Pat. No. 6,399,535 if desired.

In addition to the activator compound, it can be advantageous to employ catalytic quantities of certain halogenated compounds that are capable of promoting catalyst activity. Promotors of this type are especially useful in the case that the transition metal in the complex is vanadium. Such promoters are also referred to in the present Patent Specification as "reactivators". U.S. Pat. No. 5,191,042 discloses that certain vanadium-based catalysts activated with organoaluminium compounds can be promoted using a variety of halogenated organic compounds, for example, carbon tetrachloride, hexachloroethylene, benzylbromide, benzylchloride and 2,3- or 1,3-dichloropropylene. Other examples of halogenated organic compounds that can be used in this manner as reactivators are ethyl trichloroacetate, chloroform ($CHCl_3$) and n-butylchloride. U.S. Pat. No. 5,191,042 also refers to the disclosure of Cooper (T. A Cooper, Journ. Am. Chem. Soc., 4158 (1973), which defines in Table 1 an organic halide activity index based on the ability of the halide to oxidize certain vanadium compounds under standard conditions. For example, carbon tetrachloride is assigned a reactivity of 1 in tetrahydrofuran at 20° C., and other listed halogenated organic compounds have reactivities of from about 0.02 to greater than 200 relative to carbon tetrachloride. When it is desired to use a halogenated promotor, it is preferred to use those having a Cooper Index ranging from about 0.01 up to about 30. The use of such promoters, especially in combination with vanadium-based catalysts is generally well known in the art, and for details of use of the such promoters reference may be made to U.S. Pat. No. 5,191,042 and to other prior art in this field. In the present invention it is possible to employ any halogenated organic compound as a promoter, but the compounds mentioned above are preferred.

A preferred embodiment of the present invention provides a catalyst comprising (1) a transition metal compound having the following Formula B or C, and optionally (2) an activating quantity of a suitable activator,

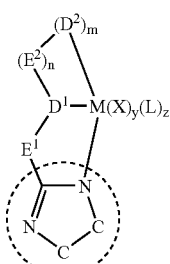

Formula B

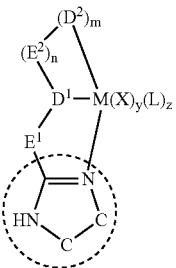

Formula C wherein the imidazole nucleus shown within the dotted circle is selected from the divalent groups represented by the Formulae Ia, IIa, IIIa, IVa, Va and VIa,

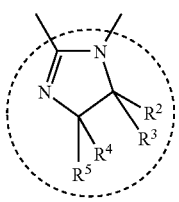

Ia

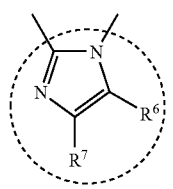

IIa

-continued

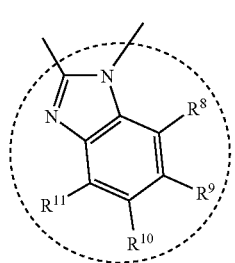

IIIa

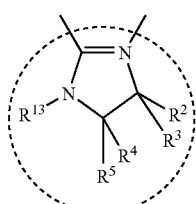

IVa

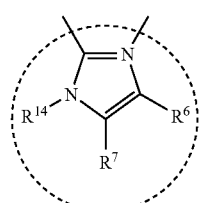

Va

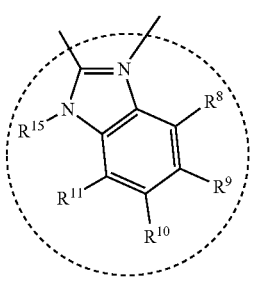

VIa wherein M is a metal from Group 3 to 11 of the Periodic Table or a lanthanide metal; $E^1$ and $E^2$ are divalent groups independently selected from (i) aliphatic hydrocarbon, (ii) alicyclic hydrocarbon, (iii) aromatic hydrocarbon, (iv) alkyl substituted aromatic hydrocarbon (v) heterocyclic groups and (vi) heterosubstituted derivatives of said groups (i) to (v); $D^1$ and $D^2$ are donor groups; X is an anionic group, L is a neutral donor group; n=m=zero or 1;y and z are independently zero or integers such that the number of X and L groups satisfy the valency and oxidation state of the metal M, wherein the groups $R^2$ to $R^{11}$ and $R^{13}$ to $R^{15}$ are independently hydrogen or a monovalent (i) aliphatic hydrocarbon, (ii) alicyclic hydrocarbon, (iii) aromatic hydrocarbon, (iv) alkyl substituted aromatic hydrocarbon (v) heterocyclic groups, (vi) heterosubstituted derivatives of said groups (i) to (v), and (vii) hydrocarbyl-substituted heteroatom groups characterized in that the complex contains at least one polymerisable olefinic double bond which is present in, or substituent to, at least one of the atoms, groups or ligands represented by E, D, L and the said imidazole group.

$R^{13}$ to $R^{15}$ are preferably hydrogen.

If desired the polymerisable olefinic double bond in the transition metal compound of Formula B or Formula C complex which is present in, or substituent to, at least one of the atoms, groups or ligands represented by Z, E, D and L can be present in or substituent to any one or more of the groups $R^2$ to $R^{11}$ and/or $R^{13}$ to $R^{15}$.

M is preferably selected from Groups 3 to 7 of the periodic table.

Groups $R^2$ to $R^{11}$ are preferably selected from the groups defined above in relation to the Formula I, II, III, IV, V and VI groups.

In this preferred embodiment of the present invention, $D^1$ and $D^2$ can be the same or different donor groups, for example oxygen, sulfur, an amine, an imine or a phosphine. Preferably $D^1$ and $D^2$ are selected from oxygen, sulfur, an amine of formula —N($R^{12}$)— or a phosphine of formula —P($R^{13}$)— wherein $R^{12}$ and $R^{13}$ are hydrogen or (i) aliphatic hydrocarbon, (ii) alicyclic hydrocarbon, (iii) aromatic hydrocarbon, (iv) alkyl substituted aromatic hydrocarbon (v) heterocyclic groups, (vi) heterosubstituted derivatives of said groups (i) to (v), (vii) hydrocarbyl-substituted heteroatom groups and (viii) further imidazole-containing groups.

Preferably $D^1$ is nitrogen for example —$NR^1$— or =N— or a nitrogen-containing group, for example —N($R^1$)— $R^{20}$— wherein $R^1$ represents a monovalent group and $R^{20}$ represents a divalent group derived from, for example, aliphatic hydrocarbon groups such as methyl, ethyl, ethylenyl, butyl, hexyl, isopropyl and tert-butyl. Examples of suitable alicyclic hydrocarbon groups are adamantyl, norbornyl, cyclopentyl and cyclohexyl. Examples of suitable aromatic hydrocarbon groups are phenyl, biphenyl, naphthyl, phenanthryl and anthryl. Examples of suitable alkyl substituted aromatic hydrocarbon groups are benzyl, tolyl, mesityl, 2,6-diisopropylphenyl and 2,4,6-triisopropyl. Examples of suitable heterocyclic groups are 2-pyridinyl, 3-pyridinyl, 2-thiophenyl, 2-furanyl, 2-pyrrolyl, 2-quinolinyl. Suitable substituents for forming heterosubstituted derivatives of said groups $R^1$ to $R^{11}$ are, for example, chloro, bromo, fluoro, iodo, nitro, amino, cyano, ether, hydroxyl and silyl, methoxy, ethoxy, phenoxy (i.e. —$OC_6H_5$), tolyloxy (i.e. —$C_6H_4(CH_3)$), xylyloxy, mesityloxy, dimethylamino, diethylamino, methylethylamino, thiomethyl, thiophenyl and trimethylsilyl. Examples of suitable heterosubstituted derivatives of said groups (i) to (v) are 2-chloroethyl, 2-bromocyclohexyl, 2-nitrophenyl, 4-ethoxyphenyl, 4-chloro-2-pyridinyl, 4-dimethylaminophenyl and 4-methylaminophenyl. Examples of suitable hydrocarbyl-substituted heteroatom groups are chloro, bromo, fluoro, iodo, nitro, amino, cyano, ether, hydroxyl and silyl, methoxy, ethoxy, phenoxy (i.e. —$OC_6H_5$), tolyloxy (i.e. —$OC_6H_4(CH_3)$), xylyloxy, mesityloxy, dimethylamino, diethylamino, methylethylamino, thiomethyl, thiophenyl and trimethylsilyl. Any of the substituents $R^1$ to $R^{11}$ may be linked to form cyclic structures. Substituents $R^2$ to $R^{11}$ may also suitably be inorganic groups such as fluoro, chloro, bromo, iodo, nitro, amino, cyano and hydroxyl Preferably $D^2$ is an imidazole group selected from the groups of Formula Ia, IIa and IIIa above.

As indicated above, the values of m and n in the present invention are such that m=n=zero or one. For the avoidance of doubt, this means that for a given complex, when m is zero, n is also zero. And when m is 1,n is also 1.

When m and n are zero in Formula A, the Formula reduces to Formula D, preferably to Formula E or Formula F Formula D

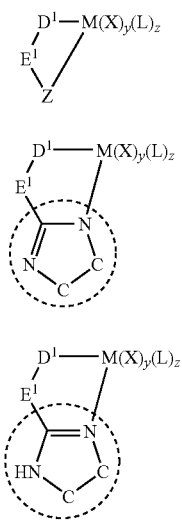

Formula E

Formula F wherein D1, E1, Z, M, X, L, y and z are as defined above, and wherein the imidazole nucleus within the dotted circle is selected from the divalent groups represented by the Formulae Ia, IIa, IIIa, IVa, Va and VIa Ia

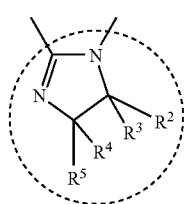

IIa

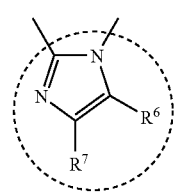

IIIa

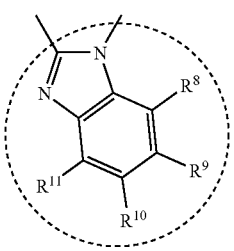

IVa

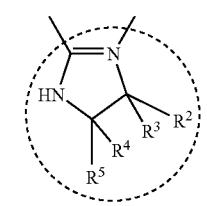

Va

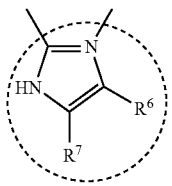

VIa

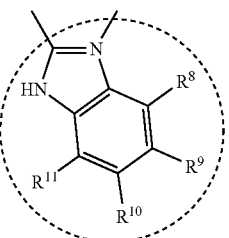

Examples of the ligand represented by $-Z-E^1-D^1-(E^2)-(D^2)_m-$ in Formula A (and represented by

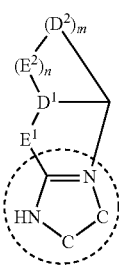

in Formula C are ligands Lig G and Lig H.

Lig G

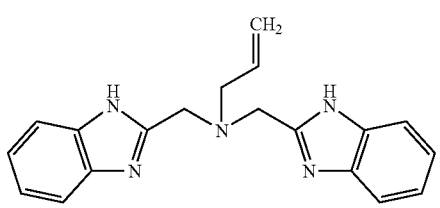

Lig H

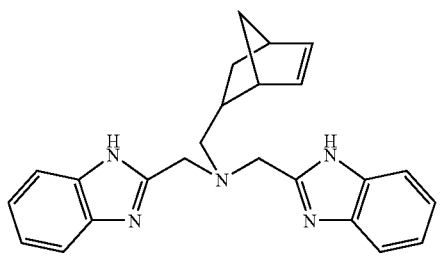

(exo- and endo-isomers)

Thus Lig G and Lig H represent some examples of those suitable for making the complexes of Formula A and Formula C in accordance with the present invention. Lig H can be in endo and/or exo isomeric form.

Some further ligands suitable for making complexes of the type defined in Formula A (and Formula C) are

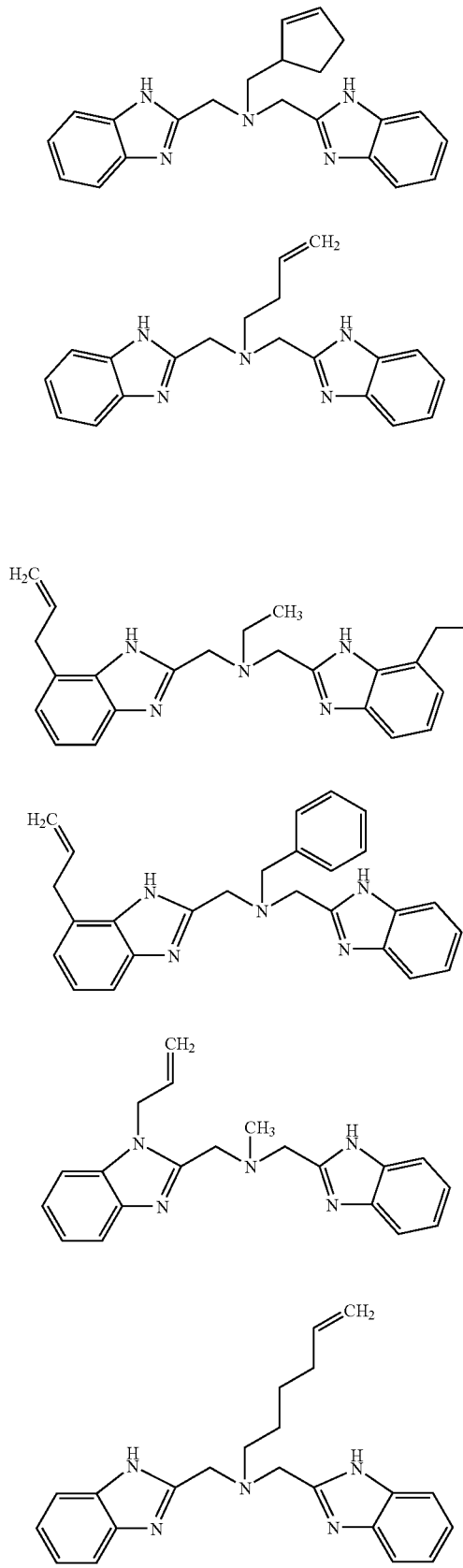

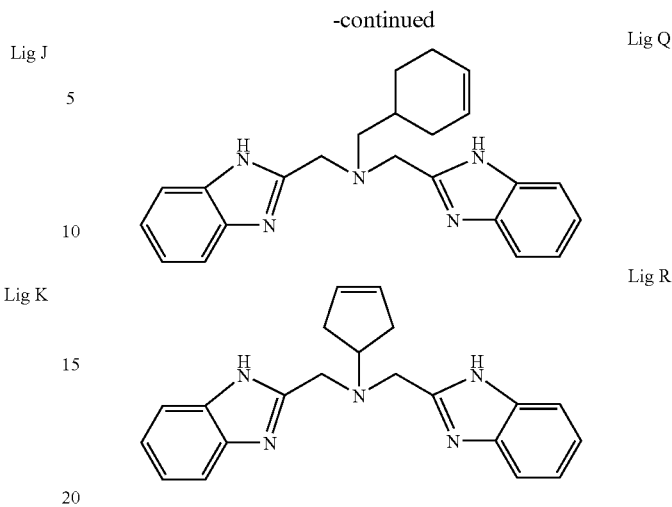

These ligands can be used to make complexes and catalysts in accordance with the present invention wherein the transition metal is preferably titanium, zirconium, hafnium, vanadium or chromium.

The following is an example of a transition metal complex that can be employed in the catalyst of the present invention:

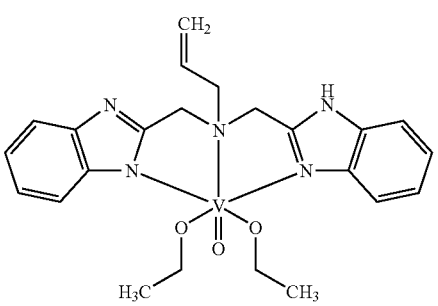

The catalyst of the present invention can, if desired, be utilized on a support material. Suitable support materials are, for example, silica, alumina, or zirconia, magnesia, magnesium chloride or a polymer or prepolymer, for example polyethylene, polystyrene, or poly(aminostyrene).

The catalysts of the present invention can if desired comprise more than one of the defined transition metal compounds.

In addition to said one or more defined transition metal compounds, the catalysts of the present invention can also include one or more other catalysts for polymerising 1-olefins. Preferably such catalysts are other types of transition metal compounds or catalysts, for example, transition metal compounds of the type used in conventional Ziegler-Natta catalyst systems, metallocene-based catalysts, or heat activated supported chromium oxide catalysts (eg Phillips-type catalyst). The catalysts of the present invention may also used in conjunction with other catalysts producing only 1-olefins, either inside or outside the polymerisation reactor, and in this way make copolymers of ethylene or propylene and these 1-olefins. Suitable catalysts for producing 1-olefins may produce only 1-butene, only 1-hexene or a distribution (for example, a Schulz-Flory distribution) of 1-olefins.

The catalyst or catalysts of the present invention can be employed, if desired, using processes analogous to those disclosed in WO02/46246 and U.S. Pat. No. 6,605,675.For example, a catalyst component slurry and a catalyst component solution can be combined before or during introduction into the polymerisation reactor. The properties of polymers produced using such methods can be advantageously controlled thereby. The catalysts of the present invention can also be employed in the process disclosed in U.S. Pat. No. 6,610,799.In this process, mixtures of two or more supported catalysts can be utilized containing differing amounts of catalyst components wherein the concentrations of the individual catalyst components can be independently controlled within the polymerisation reactor.

If desired the catalysts can be formed in situ in the presence of the support material, or the support material can be pre-impregnated or premixed, simultaneously or sequentially, with one or more of the catalyst components. The catalysts of the present invention can if desired be supported on a heterogeneous catalyst, for example, a magnesium halide supported Ziegler Natta catalyst, a Phillips type (chromium oxide) supported catalyst or a supported metallocene catalyst. Formation of the supported catalyst can be achieved for example by treating the transition metal compounds of the present invention with alumoxane in a suitable inert diluent, for example a volatile hydrocarbon, slurrying a particulate support material with the product and evaporating the volatile diluent. The produced supported catalyst is preferably in the form of a free-flowing powder. The quantity of support material employed can vary widely, for example from 100,000 to 1 grams per gram of metal present in the transition metal compound.

The present invention further provides a process for producing particulate self-supported olefin polymerisation catalyst preferably free from, or substantially free from, added solid support material. The process comprises forming a slurry or solution comprising (1) the transition metal complex of Formula A in (2) a hydrocarbon liquid optionally in the presence of (3) an activator, to form a fluid catalyst system and contacting said system with at least one polymerisable olefin to produce a prepolymer containing polymerised units of the polymerisable olefin copolymerised with the at least one polymerisable olefinic double bond present in the complex. Accordingly this aspect of the present invention provides a process for producing a particulate self-supported olefin polymerisation catalyst comprising forming a slurry or solution comprising (1) the transition metal complex of Formula A Formula A

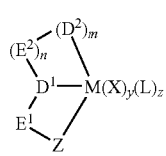

wherein Z comprises a five-membered heterocyclic group, the five membered heterocyclic group containing at least one carbon atom, at least one nitrogen atom and at least one other hetero atom selected from nitrogen, sulphur and oxygen, the remaining atoms in said ring being selected from nitrogen and carbon; M is a metal from Group 3 to 11 of the Periodic Table or a lanthanide metal; $E^1$ and $E^2$ are divalent groups independently selected from (i) aliphatic hydrocarbon, (ii) alicyclic hydrocarbon, (iii) aromatic hydrocarbon, (iv) alkyl substituted aromatic hydrocarbon (v) heterocyclic groups and (vi) heterosubstituted derivatives of said groups (i) to (v); $D^1$ and $D^2$ are donor atoms or groups; X is an anionic group, L is a neutral donor group; n=m=zero or 1;y and z are independently zero or integers such that the number of X and L groups satisfy the valency and oxidation state of the metal M, characterized in that the complex contains at least one polymerisable olefinic double bond which is present in, or substituent to, at least one of the atoms, groups or ligands represented by Z, E, D and L, in (2) a hydrocarbon liquid optionally in the presence of (3) an activator, to form a fluid catalyst system and contacting said system with at least one polymerisable olefin to produce a prepolymer containing polymerised units of the polymerisable olefin copolymerised with the at least one polymerisable olefinic double bond present in the complex of Formula A.

The complex employed in this aspect of the present invention is preferably soluble in the hydrocarbon liquid. Suitable liquid hydrocarbons are aliphatic and aromatic hydrocarbons, for example, butane, pentane, hexane, cyclohexane, toluene, cumene, ethyl benzene and xylenes.

Techniques for forming particulate self-supported olefin polymerisation catalyst by prepolymerisation of catalyst with relatively small portions of polymerisable monomer are well known in the art. For example U.S. Pat. No. 6,677,265,column 5,line 38 to column 9,line 39 discloses methods for making prepolymer using metallocene catalyst activated with alumoxane. The methods disclosed in this reference can, if desired, be applied to the production of the self-supported catalyst of the present invention, the metallocene being replaced by the Formula A complex of the present invention and the alumoxane being replaced by the optional activator of the present invention. The prepolymerisation can be conducted under continuous, semi continuous or batch conditions. The monomer or monomers employed are preferably the same as the monomer which is to be used in the final commercial scale production of polymer. Thus for example, it is preferred to prepolymerise ethylene to make prepolymer for the commercial scale manufacture of polyethylene or ethylene copolymers. Likewise, propylene is preferred when the prepolymer is used in the production of polypropylene. The prepolymerisation is preferably conducted under conditions that provide prepolymer particles having a mean particle diameter in the range 1 to 100 microns, preferably 10 to 80 microns, more preferably 20 to 70 microns. Good results are achieved using the prepolymers having the particle size distributions referred to in U.S. Pat. No. 6,677,265 at column 7 lines 23 to 67.The prepolymerisation temperature is suitably in the range −15° C. to +110° C., preferably in the range 0° C. to 40° C., more preferably 20° to 30° C. The mole ratio of monomer to transition metal fed to the prepolymerisation reaction is preferably such as to provide a mole ratio in the range 150 to 1500,more preferably 175 to 1000 (monomer/transition metal). After the prepolymerisation has been carried out to the desired extent, the produced prepolymer is preferably separated from the reaction liquid, eg by filtration, decantation, or centrifugation. The isolated solid prepolymer is preferably washed with clean dry hydrocarbon and dried to form a free-flowing powder. However, if desired, the prepolymerised catalyst can be used direct from the prepolymerisation process as a slurry in the prepolymerisation reaction medium or in fresh hydrocarbon medium. The prepolymer is preferably prepared in the presence of a "reactivator" of the type referred to earlier in this Specification. Under these circumstances the molar ratio of complex Formula A/optional activator/reactivator preferably lies in the range 1/10/5 to 1/10000/5000,more preferably in the range 1/100/50 to 1/1000/500.

The present invention further provides a process for the polymerisation and copolymerisation of 1-olefins, cycloolefins or dienes, comprising contacting the monomer under polymerisation conditions with the polymerisation catalyst or the prepolymerised catalyst of the present invention.

Suitable monomers for use in making homopolymers using the polymerisation process of the present invention are, for example, ethylene, propylene, butene, hexene, styrene or conjugated or non-conjugated dienes. Preferred monomers are ethylene and propylene.

Suitable monomers for use in making copolymers using the polymerisation process of the present invention are ethylene, propylene, 1-butene, 1-hexene, 4-methylpentene-1,1-octene, norbornene, substituted norbornenes, dienes, eg butadiene, ethylidene norbornene, methyl methacrylate, methyl acrylate, butyl acrylate, acrylonitrile, vinyl acetate, vinyl chloride, and styrene.

A particularly preferred process in accordance with the present invention is the copolymerisation of ethylene and or propylene with comonomers selected from 1-olefins, acrylic acid esters, vinyl esters and vinyl aromatic compounds. Examples of suitable comonomers are 1-butene, 1-hexene, 4-methylpentene-1,methyl methacrylate, methyl acrylate, butyl acrylate, acrylonitrile, vinyl acetate, and styrene.

Preferred polymerisation processes are the homopolymerisation of ethylene or the homopolymerisation of propylene or copolymerisation of ethylene with one or more of propylene, butene, hexene-1 and 4-methylpentene-1 or copolymerisation of propylene with one or more of ethylene or butene.

The polymerisation conditions can be, for example, bulk phase, solution phase, slurry phase or gas phase. If desired, the catalyst can be used to polymerise ethylene under high pressure/high temperature process conditions wherein the polymeric material forms as a melt in supercritical ethylene. Preferably the polymerisation is conducted under gas phase fluidised or stirred bed conditions.

Slurry phase polymerisation conditions or gas phase polymerisation conditions are particularly useful for the production of high-density grades of polyethylene. In these processes the polymerisation conditions can be batch, continuous or semi-continuous. In the slurry phase process and the gas phase process, the catalyst is generally fed to the polymerisation zone in the form of a particulate solid. This solid can be, for example, an undiluted solid catalyst system formed from the complex A and an activator, or can be the solid complex A alone. In the latter situation, the activator can be fed to the polymerisation zone, for example as a solution, separately from or together with the solid complex. Preferably the catalyst system or the transition metal complex component of the catalyst system employed in the slurry polymerisation and gas phase polymerisation is supported on a support material. Most preferably the catalyst system is supported on a support material prior to its introduction into the polymerisation zone. Suitable support materials are, for example, silica, alumina, zirconia, talc, kieselguhr, magnesia, magnesium chloride and polymers. Impregnation of the support material can be carried out by conventional techniques, for example, by forming a solution or suspension of the catalyst components in a suitable diluent or solvent, and slurrying the support material therewith. The support material thus impregnated with catalyst can then be separated from the diluent for example, by filtration or evaporation techniques.

In the slurry phase polymerisation process the solid particles of catalyst, or supported catalyst, are fed to a polymerisation zone either as dry powder or as a slurry in the polymerisation diluent. Preferably the particles are fed to a polymerisation zone as a suspension in the polymerisation diluent. The polymerisation zone can be, for example, an autoclave or similar reaction vessel, or a continuous loop reactor, e.g. of the type well know in the manufacture of polyethylene by the Phillips Process. When the polymerisation process of the present invention is carried out under slurry conditions the polymerisation is preferably carried out at a temperature above 0° C., most preferably above 15° C. The polymerisation temperature is preferably maintained below the temperature at which the polymer commences to soften or sinter in the presence of the polymerisation diluent. If the temperature is allowed to go above the latter temperature, fouling of the reactor can occur. Adjustment of the polymerisation within these defined temperature ranges can provide a useful means of controlling the average molecular weight of the produced polymer. A further useful means of controlling the molecular weight is to conduct the polymerisation in the presence of hydrogen gas which acts as chain transfer agent. Generally, the higher the concentration of hydrogen employed, the lower the average molecular weight of the produced polymer.

The use of hydrogen gas as a means of controlling the average molecular weight of the polymer or copolymer applies generally to the polymerisation process of the present invention. For example, hydrogen can be used to reduce the average molecular weight of polymers or copolymers prepared using gas phase, slurry phase or solution phase polymerisation conditions. The quantity of hydrogen gas to be employed to give the desired average molecular weight can be determined by simple "trial and error" polymerisation tests.

Methods for operating gas phase polymerisation processes are well known in the art. Such methods generally involve agitating (e.g. by stirring, vibrating or fluidising) a bed of catalyst, or a bed of the target polymer (i.e. polymer having the same or similar physical properties to that which it is desired to make in the polymerisation process) containing a catalyst, and feeding thereto a stream of monomer at least partially in the gaseous phase, under conditions such that at least part of the monomer polymerises in contact with the catalyst in the bed. The bed is generally cooled by the addition of cool gas (eg recycled gaseous monomer) and/or volatile liquid (eg a volatile inert hydrocarbon, or gaseous monomer which has been condensed to form a liquid). The polymer produced in, and isolated from, gas phase processes forms directly a solid in the polymerisation zone and is free from, or substantially free from liquid. As is well known to those skilled in the art, if any liquid is allowed to enter the polymerisation zone of a gas phase polymerisation process the quantity of liquid is small in relation to the quantity of polymer present in the polymerisation zone. This is in contrast to "solution phase" processes wherein the polymer is formed dissolved in a solvent, and "slurry phase" processes wherein the polymer forms as-a suspension in a liquid diluent.

The gas phase process can be operated under batch, semi-batch, or so-called "continuous" conditions. It is preferred to operate under conditions such that monomer is continuously recycled to an agitated polymerisation zone containing polymerisation catalyst, make-up monomer being provided to replace polymerised monomer, and continuously or intermittently withdrawing produced polymer from the polymerisation zone at a rate comparable to the rate of formation of the polymer, fresh catalyst being added to the polymerisation zone to replace the catalyst withdrawn form the polymerisation zone with the produced polymer.

A problem that can occur in the gas and slurry phase polymerisation of olefins is that of fouling of the reactor walls, any stirrer that may be present and spalling or agglomeration of the polymer due, for example, to the presence of static electricity. The problem can be reduced or eliminated by judicious use of suitable antistatic agents. One example of a family of antistatic agents suitable for use in the polymerisation of olefins are commercially available under the trade name "STADIS".

When using the catalysts of the present invention under gas phase polymerisation conditions, the catalyst, or one or more of the components employed to form the catalyst can, for example, be introduced into the polymerisation reaction zone in liquid form, for example, as a solution in an inert liquid diluent. Thus, for example, the transition metal component, or the activator component, or both of these components can be dissolved or slurried in a liquid diluent and fed to the polymerisation zone. Under these circumstances it is preferred the liquid containing the component(s) is sprayed as fine droplets into the polymerisation zone. The droplet diameter is preferably within the range 1 to 1000 microns. EP-A-0593083,the teaching of which is hereby incorporated into this specification, discloses a process for introducing a polymerisation catalyst into a gas phase polymerisation. The methods disclosed in EP-A-0593083 can be suitably employed in the polymerisation process of the present invention if desired.

The catalyst of the present invention can be used in conventional commercial polymerisation facilities and its use can be sandwiched between production runs using other commercial catalyst systems of the supported or unsupported type, eg, using Ziegler Natta catalysts, metallocene catalysts, heat activated chromium oxide catalysts and late transition metal catalyst systems. Transitioning between catalyst systems of these types has been extensively described in the prior art and reference may be made to the prior art methods for analogously suitable methods readily adaptable to use of the catalyst of the present invention. For example, see EP 751965, U.S. Pat. Nos. 5,442,019, 5,672,665, 5,747,612, 5,753,786, EP 830393, U.S. Pat. No. 5,672,666, EP1171486, EP885247, EP1182216, U.S. Pat. No. 6,284,849. US2004/0127655, WO04/060938, US2004/0138391, WO, 04/060921, WO04/060922, WO04/060929, WO04/060930, and WO04/060931.

The present invention also provides a process for the oligomerisation and cooligomerisation of 1-olefins, comprising contacting the monomeric olefin under oligomerisation conditions with the catalyst of the present invention.

Suitable monomers for use in making homooligomers using the oligomerisation process of the of the present invention are, for example, ethylene, propylene, butene, hexene, and styrene. The preferred monomer is ethylene.

Suitable monomers for use in making co-oligomers using the oligomerisation process of the present invention are ethylene, propylene, 1-butene, 1-hexene, 1-octene, 1-decene, 1-dodecene and further 1-olefins of the series C(n)H(2n) where n is an integer.

There exist a number of options for the oligomerisation reactor including batch, semi-batch, and continuous operation. The oligomerisation and co-oligomerisation reactions of the present invention can be performed under a range of process conditions that are readily apparent to those skilled in the art: as a homogeneous liquid phase reaction in the presence or absence of an inert hydrocarbon diluent such as toluene or heptanes; as a two-phase liquid/liquid reaction; as a slurry process where the catalyst is in a form that displays little or no solubility; as a bulk process in which essentially neat reactant and/or product olefins serve as the dominant medium; as a gas-phase process in which at least a portion of the reactant or product olefin(s) are transported to or from a supported form of the catalyst via the gaseous state. Evaporative cooling from one or more monomers or inert volatile liquids is but one method that can be employed to effect the removal of heat from the reaction. The (co-)oligomerisation reactions may be performed in the known types of gas-phase reactors, such as circulating bed, vertically or horizontally stirred-bed, fixed-bed, or fluidised-bed reactors, liquid-phase reactors, such as plug-flow, continuously stirred tank, or loop reactors, or combinations thereof. A wide range of methods for effecting product, reactant, and catalyst separation and/or purification are known to those skilled in the art and may be employed: distillation, filtration, liquid-liquid separation, slurry settling, extraction, etc. One or more of these methods may be performed separately from the (co-)oligomerisation reaction or it may be advantageous to integrate at least some with a (co-)oligomerisation reaction; a non-limiting example of this would be a process employing catalytic (or reactive) distillation. Also advantageous may be a process which includes more than one reactor, a catalyst kill system between reactors or after the final reactor, or an integrated reactor/separator/purifier. While all catalyst components, reactants, inerts, and products could be employed in the present invention on a once-through basis, it is often economically advantageous to recycle one or more of these materials; in the case of the catalyst system, this might require reconstituting one or more of the catalysts components to achieve the active catalyst system. It is within the scope of this invention that a (co)oligomerisation product might also serve as a reactant (e.g. 1-hexene, produced via the oligomerisation of ethylene, might be converted to decene products via a subsequent co-oligomermerisation reaction with two further ethylene units).

The catalyst systems of the present invention can present a variety of advantages over the prior art systems. In general the catalysts are easy to synthesise, have high activity and good catalyst life when employed under conventional industrial polymerisation conditions. The catalysts provide polyolefins having improved particle morphology. Generally the catalysts exhibit single site behavior which tends to favor the production of narrow molecular weight distribution polymers having uniform properties. Generally, the vanadium based catalysts of the present invention are capable of making very high molecular weight polymers.

The invention is further illustrated with reference to the following Examples. In the Examples all manipulations of air/moisture-sensitive materials were performed on a conventional vacuum/inert atmosphere (nitrogen) line using standard Schlenk line techniques, or in an inert atmosphere glove box.

EXAMPLE 1

1.1—Preparation of Diethyl N-allyliminodiacetate $$\text{BrCH}_2\text{CO}_2\text{Et} + \text{H}_2\text{N}-\text{CH}_2-\text{CH}=\text{CH}_2 \xrightarrow{\text{K}_2\text{CO}_3}$$

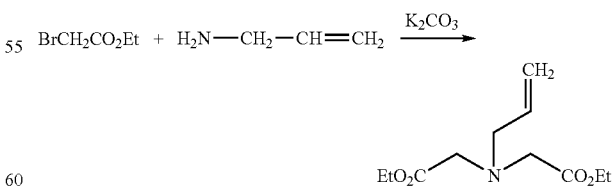

Ethyl bromoacetate (10 ml, 90.2 mmol) was added slowly at −20° C. to a stirred mixture of 3.4 ml (45.1 mmol) allyl amine and 12.4 g (90.2 mmol) anhydrous potassium carbonate. The reaction mixture was left to warm up and stirred at room temperature for 2 hour. It was then stirred for one hour at 80°

C., cooled to room temperature and diluted with 20 ml water. The two-phase mixture was stirred intensively for 10 minutes and the organic layer separated. It was mixed with 30 ml dichloromethane, washed with water (2×10 ml) and dried over $Na_2SO_4$. The dichloromethane was removed under reduced pressure and the residual oil collected. Yield 8.5 g (82.2%). 1H NMR (250 MHz, $CDCl_3$), □, ppm: 1.20 (t, 6H), 3.48 (s, 4H), 4.10 (q, 4H), 5.10 (m, 2H), 5.80 (m 1H).

1.2—Preparation of N,N-bis(1H-benzimidazol-2-ylmethyl)-N-allylamine

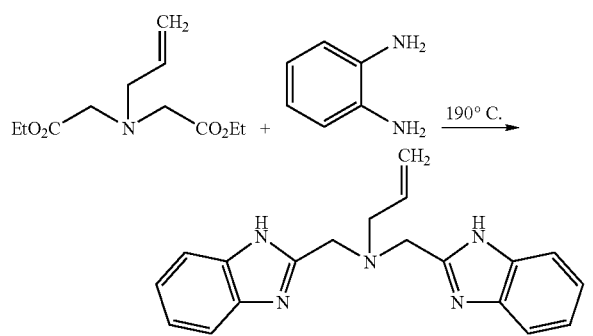

A mixture of 7.3 g (32.0 mmol) diethyl N-allyliminodiacetate and 6.9 g (64 mmol) o-phenylene diamine was stirred at 190° C. for 4 hour and the formed volatile materials were distilled off. The reaction mixture was then left to cool down to room temperature and acetone (100 ml) was added. The mixture was sonicated for 10 minutes, the formed residue filtered, washed with 2×5 ml acetone and dried under vacuum. Yield—4.5 g (44.0%). 1H NMR (250 MHz, $CDCl_3$□, ppm: 3.22 (d, 2H), 3.95 (m, 4H), 5.20 (m, 2H), 5.90 (m, 1H), 7.15 (m, 4H), 7.53 (m, 4H), 12.11 (br.s 2H).

1.3—Preparation of {[N,N-bis(1H-benzimidazol-2-ylmethyl)-N-allylamine]dipropoxyoxovanadium(V)

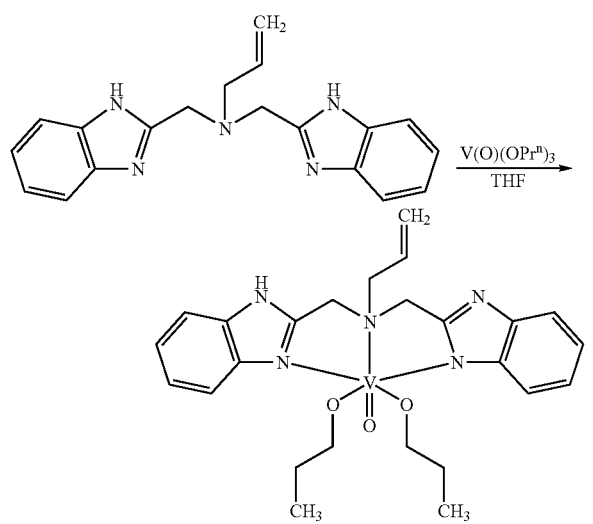

A solution of 0.53 g (2.17 mmol) tripropoxyoxovanadium (V) in 10 ml THF, cooled to −78° C., was added to a cold (−78° C.) slurry of 0.69 g (2.17 mmol) [N,N-bis(1H-benzimidazol-2-ylmethyl)-N-allyllamine] in 30 ml THF. The mixture was allowed to warm up to room temperature and stirred for 1 hour. The orange-red solution was then evaporated to approximately 5 ml. Addition of 100 ml pentane resulted in the formation of an orange solid which was filtered, washed with 3×5 ml pentane and dried under reduced pressure. Yield—0.65 g (62.3%). $^1$H NMR (250 MHz, $D^2$-DCM), δ: 0.85 (t, $J_{HH}$=14.4 Hz 6H), 1.62 (m, 4H), 3.09 (br d, 2H), 3.85 (d, $J_{HH}$=5.5 Hz, 2H), 4.06 (d, $J_{HH}$=14.7 Hz, 2H), 4.85 (m, 2H), 5.08 (m, 2H), 5.33 (m, 2H), 5.5d (br.s, 1H), 7.13 (m, 4H), 7.35 (br.s , 2H), 8.03 (d, $J_{HH}$=7.6 Hz, 2H). $^{51}$V NMR [131 MHz, V(O)$Cl_3$, $d^2$-DCM], δ, ppm: −559.0

EXAMPLE 2

Preparation of N,N-bis(1H-benzimidazol-2-ylmethyl)-N-bicyclo[2,2,2]hept-2-ene-5ylamine

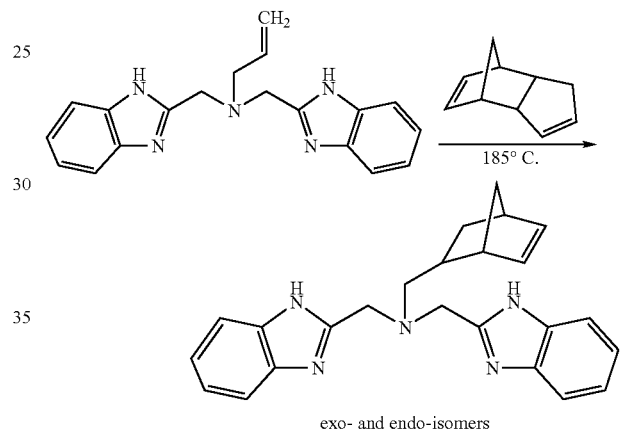

exo- and endo-isomers

A mixture of 1.2 g (37.8 mmol) N,N-bis(1H-benzimidazol-2-ylmethyl)-N-allylamine and 0.25 ml (18.9 mmol) of dicyclopentadiene were stirred in a sealed steel ampoule at 185° C. for 6 hours. The dicyclopentadiene cracks at this temperature to form cyclopentadiene. The reaction mixture was cooled to room temperature, and dissolved in 100 ml dichloromethane. The solution was filtered-and the filtrate evaporated under reduced pressure to c.a. 2-3 ml. Addition of 100 ml pentane resulted in the formation of a pale-brown precipitate, which was filtered, washed with pentane (2×10 ml) and dried under reduced pressure. Yield—1.1 g (75.9%).

EXAMPLE 3

Ethylene Polymerisation With the Complex Prepared in Example 1.3

The required amount of catalyst precursor (0.5-5 mg) was suspended in 50-100 ml toluene followed by the addition of the co-catalyst (diethylaluminium chloride—0.5 mmol). Thus prepared the solution can be used immediately or stored at 0° C. for a number of days.

The ethylene polymerisation reactions were carried out in a 400 ml "Fischer-Porter" glass reactor equipped with a gas inlet, a catalyst inlet, a mechanical stirrer and a digital thermometer. An aliquot of 1 ml of the catalyst solution described above was injected in the reactor containing 220 ml toluene, 0.05-0.5 mmol scavenger dimethylaluminium chloride (DMAC) and 10-60 μmol reactivator (ethyl trichloroacetate—ETA). The reactor was then connected to the ethylene gas supply at the desired pressure and the temperature brought quickly to the required value. The reaction was carried out for 10-60 min. The reaction mixture was then cooled down to room temperature (if necessary) and the reaction terminated by venting off the ethylene. The reactor content was then poured into a beaker containing 400 ml methanol and a few drops of 2 molar HCl. The polymer was filtered, washed with methanol and dried at 60° C. under vacuum.

| Ex | Cat., μmol | Me$_2$AlCl mmol | ECA mmol | C$_2$H$_4$ bar | H$_2$ L | T° C. | Time min | PE g | Activity g mmol$^{-1}$ h$^{-1}$ bar$^{-1}$ |
|---|---|---|---|---|---|---|---|---|---|
| 3.1 | 0.13 | 0.5 | 0.04 | 4 | — | 50-55 | 15 | 3.0 | 23080 |
| 3.2 | 0.13 | 0.05 | 0.04 | 4 | 1 | 50-53 | 30 | 5.0 | 19230 |

EXAMPLE 4

4.1—Preparation of a "Self-Supported" Vanadium Catalyst

The complex prepared as in Example 1.3 (above) 12 mg (24 μmol) was dissolved in 20 ml toluene and activated with 2.5 ml of 1 molar DMAC. After the addition of 0.8 ml 141 mmol EtOC(O)CCl$_3$ the Schlenk tube was transferred to an ethylene line and ethylene gas was bubbled through the catalyst solution at atmospheric pressure and room temperature for 20 min. The formed polymer containing the supported catalyst was precipitated with pentane, filtered, washed with pentane (3×30 ml) and dried at room temperature under reduced pressure to give 2.5 g supported catalyst, containing 9.6 μmol V (maximum) per gram of polymer support.

4.2—Ethylene Polymerisation Procedure

To the "self-supported" catalyst described in 4.1 (0.1 g, 0.96 μmol V), suspended in 220 ml heptane were added 0.4 ml 1 molar DMAC and 0.45 ml 141 mM EtOC(O)CCl$_3$ in toluene. The Fischer-Porter reactor was then connected to the ethylene line and the ethylene polymerisation was carried out at 50° C. at 4 bar ethylene pressure for 1 hour. The formed polymer was filtered, washed with heptane and dried at 60° C. under reduced pressure. Polymer yield 5.2 g. Activity—1354 g mmol$^{-1}$h$^{-1}$bar$^{-1}$.

The invention claimed is:
1. A polymerisation catalyst comprising
   (1) a transition metal compound having the following Formula A, and optionally
   (2) an activating quantity of a suitable activator,

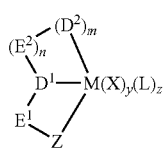

Formula A wherein Z comprises a five-membered heterocyclic group, the five-membered heterocyclic group containing at least one carbon atom, at least one nitrogen atom and at least one other hetero atom selected from nitrogen, sulphur and oxygen, the remaining atoms in said ring being selected from nitrogen and carbon; M is a metal from Group 3 to 7 of the Periodic Table or a lanthanide metal; $E^1$ and $E^2$ are divalent groups independently selected from (i) aliphatic hydrocarbon, (ii) alicyclic hydrocarbon, (iii) aromatic hydrocarbon, (iv) alkyl substituted aromatic hydrocarbon, (v) heterocyclic groups and (vi) heterosubstituted derivatives of said groups (i) to (v); $D^1$ and $D^2$ are donor atoms or groups; X is an anionic group, L is a neutral donor group; n=m=zero or 1; y and z are independently zero or integers such that the number of X and L groups satisfy the valency and oxidation state of the metal M, wherein the complex contains at least one polymerisable olefinic double bond which is present in, or substituent to, at least one of the atoms, groups or ligands represented by Z, E and D, with the proviso that when Z is an imidazole-containing group selected from

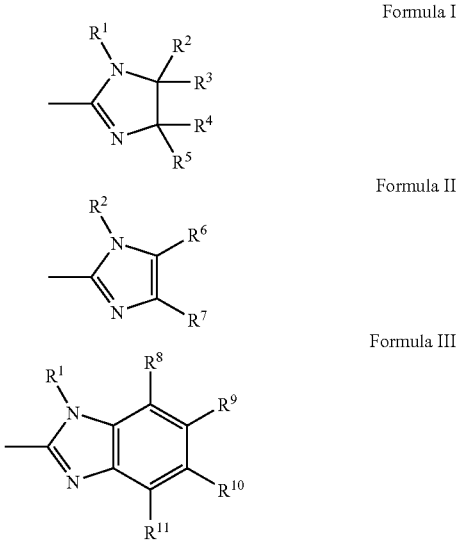

Formula I

Formula II

Formula III then none of the groups $R^1$ to $R^{11}$ is ethylenyl, and further with the proviso that the ligand in Formula A represented by —Z-$E^1$-$D^1$-$(E^2)_n$-$(D^2)_m$- is not a ligand containing the skeletal heterocyclic unit

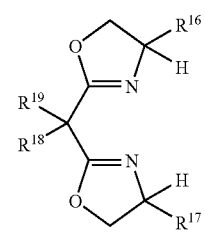

wherein $R^{16}$ and $R^{17}$ are each independently hydrocarbyl or substituted hydrocarbyl, $R^{18}$ and $R^{19}$ are each independently hydrogen, hydrocarbyl or substituted hydrocarbyl and wherein $R^{18}$ and $R^{19}$ can be taken together to form a ring.

2. A polymerisation catalyst comprising
(1) a transition metal compound having the following Formula A, and optionally
(2) an activating quantity of a suitable activator,

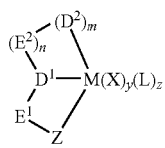

Formula A wherein Z is an imidazole-containing group; M is a metal from Group 3 to 11 of the Periodic Table or a lanthanide metal; $E^1$ and $E^2$ are divalent groups independently selected from (i) aliphatic hydrocarbon, (ii) alicyclic hydrocarbon, (iii) aromatic hydrocarbon, (iv) alkyl substituted aromatic hydrocarbon, (v) heterocyclic groups and (vi) heterosubstituted derivatives of said groups (i) to (v); $D^1$ and $D^2$ are donor groups; X is an anionic group, L is a neutral donor group; n=m=zero or 1; y and z are independently zero or integers such that the number of X and L groups satisfy the valency and oxidation state of the metal M, wherein the complex contains at least one polymerisable olefinic double bond which is present in, or substituent to, at least one of the atoms, groups or ligands represented by Z, E and D, with the proviso that when Z is an imidazole-containing group selected from

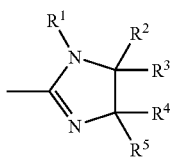

Formula I

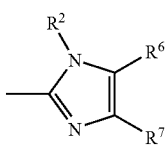

Formula II

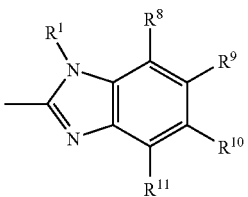

Formula III then none of the groups $R^1$ to $R^{11}$ is ethylenyl.

3. A catalyst as claimed in claim 1 wherein the polymerisable olefinic double bond is acyclic.

4. A catalyst as claimed in claim 1 wherein the polymerisable olefinic double bond is alicyclic.

5. A catalyst as claimed in claim 1 wherein the polymerisable olefinic double bond is comprised by a substituent having the general formula —$(CH_2)_p$—CH=$CH_2$ wherein p is zero or an integer from 1 to 20.

6. A catalyst as claimed in claim 2 wherein the polymerisable olefinic double bond is provided by a substituent having the general formula —$(CH_2)_p$—CH=$CH_2$ wherein p is an integer from 1 to 20.

7. A catalyst as claimed in claim 2 wherein the polymerisable olefinic double bond is provided by at least one of the substituents $R^1$ to $R^{11}$ being a group having the general formula —$(CH_2)_p$—CH=$CH_2$ wherein p is integer from 1 to 20.

8. A catalyst as claimed in claim 1 wherein divalent groups $E^1$ and $E^2$ are not linked other than through the donor atom of group $D^1$.

9. A catalyst as claimed in claim 1 wherein at least one of the atoms present in the ring of the five-membered heterocyclic group Z is bonded directly to $E^1$ and a second atom in the ring is bonded directly to M.

10. A catalyst as claimed in claim 1 wherein the atom in the five-membered ring bonded directly to $E^1$ is adjacent to a second atom in said ring and said second atom is bonded directly to M.

11. A catalyst as claimed in claim 1 wherein the five-membered heterocyclic group Z contains at least 2 carbon atoms in its ring.

12. A catalyst as claimed in claim 1 wherein the five-membered heterocyclic group Z contains at least 2 nitrogen atoms in its ring.

13. A catalyst as claimed in claim 1 wherein $E^1$ and E2 are independently selected from divalent (i) aliphatic hydrocarbon, (ii) alicyclic hiydrocarbon, (iii) aromatic hydrocarbon, (iv) alkyl substituted aromatic hydrocarbon, (v) heterocyclic groups, (vi) heterosubstituted derivatives of said groups (i) to (v), and (vii) hydrocarbyl-substituted heteroatom groups.

14. A catalyst as claimed in claim 13 wherein the divalent groups $E^1$ and/or $E^2$ are selected from —$CH_2$—, —$CH_2CH_2$—, —$CH_2CH_2CH_2$—, 1,2-phenylene, trans-1,2-cyclopentane, trans-1,2-cyclohexane, 2,3-butane, 1,1'-biphenyl, 1,1'-binaphthyl, and —$Si(Me)_2$—.

15. A catalyst as claimed in claim 1 wherein $D^1$ and $D^2$ are independently selected from oxygen, sulfur, an amine, an imine or a phosphine.

16. A catalyst as claimed in claim 1 wherein M is a metal selected from Sc, Ti, Zr, Hf, V, Nb, Ta, Cr, Mo, W, Mn and Nd.

17. A catalyst as claimed in claim 1 wherein the anionic group X is selected from chloride, bromide, methyl, benzyl, phenyl, acetate, acetylacetonate; oxide, amide, alkoxide, or hydroxyl.

18. A catalyst as claimed in claim 1 wherein X is a non-coordinating or weakly-coordinating anion.

19. A catalyst as claimed in claim 18 wherein X is selected from tetrafluoroborate, a fluorinated aryl borate and triflate.

20. A catalyst as claimed in claim 1 wherein the neutral donor group L is selected from solvate molecule, an amine, a phosphine, water, an olefin, a conjugated diene and a non-conjugated diene.

21. A catalyst as claimed in claim 1 wherein the optional activator (2) is selected from organoaluminium compounds, organoboron compounds or mixtures thereof.

22. A catalyst as claimed in claim 21 wherein the optional activator is selected from trimethylaluminium, triethylaluminium, tributylaluminium, tri-n-octylaluminium, ethylaluminium dichloride, diethylaluminium chloride, dimethyl aluminium chloride, tris(pentafluorophenyl)aluminium and alumoxanes.

23. A catalyst as claimed in claim 1 wherein the ligand represented by —Z-$E^1$-$D^1$-($E^2$)-($D^2$)$_m$ in Formula A is selected from Lig G and Lig H in the following formula and wherein Lig H is the endo and/or the exo isomeric form Lig G

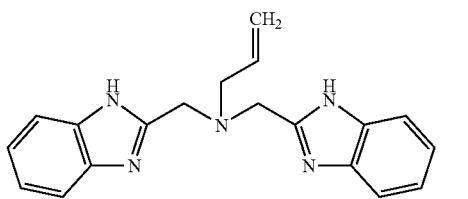

or

Lig H

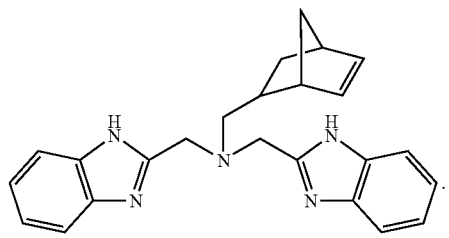

24. A catalyst as claimed in claim 1 wherein the ligand represented by —Z-E$^1$-D$^1$-(E$^2$)-(D$^2$)$_m$-in Formula A is selected from Lig J

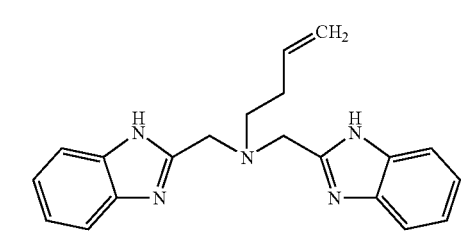

Lig K

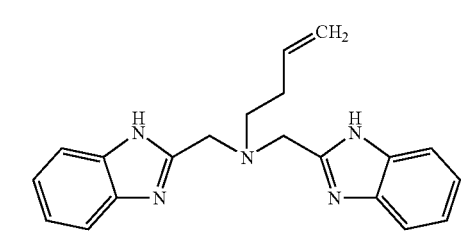

Lig M

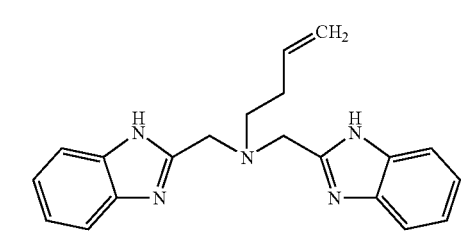

Lig N

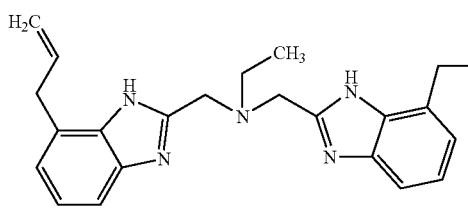

-continued

Lig P

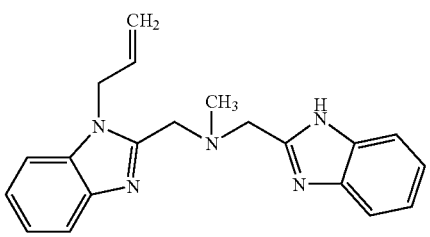

Lig Q

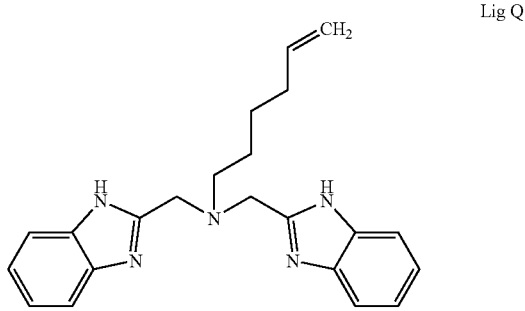

Lig Q

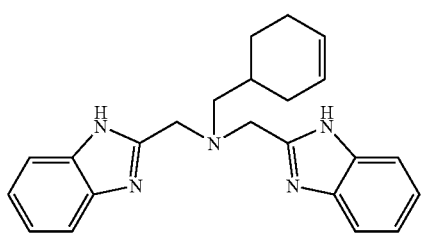

Lig R

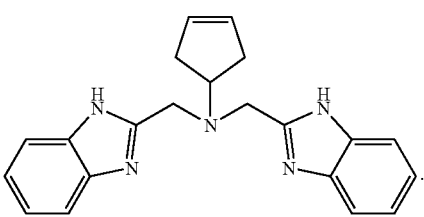

25. A catalyst as claimed in claim 1 wherein the optional activator comprises a Lewis acid selected from
    (b-1) ionic-bonding compounds having a CdCl$_2$ type or a CdI$_2$ type of layered crystal structure;
    (b-2) clays, clay minerals, or ion-exchange layered compounds;
    (b-3) heteropoly-compounds; and
    (b-4) halogenated lanthanoid compounds.

26. A process for the polymerisation and copolymerisation of 1-olefins, cycloolefins or dienes, comprising contacting the monomer under polymerisation conditions with the polymerisation catalyst claimed in claim 1.

27. A process as claimed in claim 26 wherein the polymerisation process is the homopolymerisation of a monomer selected from ethylene, propylene, butene, hexene, styrene and conjugated or non-conjugated dienes.

28. A process as claimed in claim 26 wherein the polymerisation process is the copolymerisation of ethylene and or propylene with comonomers selected from 1-olefins, acrylic acid esters, vinyl esters and vinyl aromatic compounds.

29. A process as claimed in claim 28 wherein the comonomers are selected from 1-butene, 1-hexene, 4-methylpentene-1, methyl methacrylate, methyl acrylate, butyl acrylate, acrylonitrile, vinyl acetate, and styrene.

30. A process for producing a particulate self-supported olefin polymerisation catalyst comprising forming a slurry or solution comprising a catalyst composition as claimed in claim 1 with a hydrocarbon liquid and contacting the slurry or solution with at least one polymerisable olefin to produce a prepolymer containing polymerised units of the polymerisable olefin copolymerised with the at least one polymerisable olefin double bond present in the complex of Formula A.

31. A process as claimed in claim 30 wherein the complex of Formula A is soluble in the hydrocarbon liquid.

* * * * *